United States Patent
Lee et al.

[11] Patent Number: 5,995,767
[45] Date of Patent: Nov. 30, 1999

[54] METHOD FOR CONTROLLING FOCUSING AREAS OF A CAMERA AND AN APPARATUS FOR PERFORMING THE SAME

[75] Inventors: Seoung-Eog Lee; Jin-Soo Park; Myung-Keun Yeo, all of Kyungki-do, Rep. of Korea

[73] Assignee: LG Electronics Inc., Seoul, Rep. of Korea

[21] Appl. No.: 08/998,001

[22] Filed: Dec. 24, 1997

[30] Foreign Application Priority Data

Dec. 27, 1996 [KR] Rep. of Korea ........................ 96/73869

[51] Int. Cl.⁶ ...................................................... G03B 3/10
[52] U.S. Cl. ............................................. 396/123; 396/121
[58] Field of Search ................................ 396/121, 122, 396/123, 101, 125

[56] References Cited

U.S. PATENT DOCUMENTS

| | | | |
|---|---|---|---|
| 4,827,303 | 5/1989 | Tsuboi | 396/123 |
| 5,343,246 | 8/1994 | Arai et al. | 396/121 |
| 5,353,089 | 10/1994 | Yaji | 396/123 |
| 5,396,336 | 3/1995 | Yoshii et al. | 396/121 |
| 5,418,595 | 5/1995 | Iwasaki et al. | 396/121 |
| 5,455,654 | 10/1995 | Suzuki | 396/123 |

Primary Examiner—Russell Adams
Attorney, Agent, or Firm—Finnegan, Henderson, Farabowk, Garrett & Dunner, L.L.P.

[57] ABSTRACT

In automatic focus controlling of a camera, a method for controlling focusing areas of the camera is performed by setting a supervisory area in the center of a subject area picked up by an optical system; setting plural variable areas into an outer periphery of the supervisory area; and detecting the subject to perform the auto focusing while performing area variation to the variable areas, unless the subject is detected while constantly observing the supervisory area. An apparatus for executing the method is also provided, enhancing precision of the auto focusing to the main subject in the case of multiple subjects, continuously tracking the auto focusing of the subject that moves to the outer peripheral side of the center of the picture, and improving the tracking property of the center area when varying the picture areas.

13 Claims, 6 Drawing Sheets

METHOD FOR CONTROLLING FOCUSING AREAS OF A CAMERA AND AN APPARATUS FOR PERFORMING THE SAME

BACKGROUND OF THE INVENTION

1. Field of the Invention

The present invention relates to an automatic focusing control technique of a camera, and more particularly to a method for controlling focusing areas of a camera for partitioning a picture picked up by an optical system into a plurality of areas, and an apparatus for executing the same.

2. Description of the Prior Art

A technique for controlling auto focusing of a camera is used for detecting a subject by using a luminance signal of the subject that is picked up via a camera lens, and driving an optical system to be fitted to the detected subject, thereby automatically adjusting its focus. FIG. 1 illustrates a block diagram showing a conventional circuit for controlling auto focusing of a camera.

Referring to FIG. 1, the conventional circuit for controlling the auto focusing of the camera includes an optical system 10 including an objective lens 10a, a zoom lens 10b, an iris 10c and a focusing lens 10d, and a charge-coupled device (hereinafter simply referred to as "CCD") 20 for converting an image of a subject picked up via optical system 10 into an electric signal. Additionally, an automatic gain controller (hereinafter simply referred to as "AGC") circuit 30 carries out automatic gain control of a video signal converted by means of CCD 20. A digital signal processing section 40 digitizes the AGC-processed video signal, and separates it into a luminance signal and a chrominance signal to process the obtained signals, and a high-pass filter 42 filters an output luminance signal of digital signal processing section 40 to provide only high band components thereof. An area setting section 44 sets an area for performing focusing controlling by using the high-pass filtered luminance signal as an input, and an evaluation value detecting section 46 detects an evaluation value of the subject luminance signal within the area which is set in area setting section 44. In addition to these, a controlling section 48 judges whether the subject is detected or not by means of the evaluation value detected in evaluation value detecting section 46 and provides a focusing area control signal and a lens driving control signal in accordance with the result of the determination. A motor driving section 130 receives the lens driving control signal from controlling section 48 and provides a driving signal. A focusing lens motor 140 drives focusing lens 10d in accordance with the driving signal.

The image picked up by optical system 10 is converted into an electric video signal in CCD 20 via objective lens 10a, zoom lens 10b, iris 10c and focusing lens 10d. Then, the resultant video signal is automatically gain-controlled by AGC circuit 30 to be supplied into digital signal processing section 40.

An A/D converter 40a of digital signal processing section 40 converts an analog video signal input into a digital signal, and an Y/C separator 40b separates the digital video signal into luminance signal Y and chrominance signal C.

Separated chrominance signal C is processed via a chrominance signal processor 40c, and luminance signal Y is processed via a luminance signal processor 40d. By doing so, a composite video signal CVS is obtained by adding signals C and Y in adder 40e.

At this time, the luminance signal provided from luminance signal processor 40d is filtered by high-pass filter 42 to provide only the high band components of the luminance signal corresponding to the outline portion of the image, and area setting section 44 receives the high-pass filtered luminance signal to execute the auto focusing controlling upon the subject picked up by optical system 10.

More specifically, in the conventional technique as shown in FIG. 2, a picture area is set by a first area A1 and a second area A2, in which the auto focusing operation is performed depending on whether the subject is detected within first area A1 or not after first area A1 is fixed.

In this case, the picture area is divided into two areas A1 and A2. Unless subject is detected within area A1, the subject is detected in its expanding area A2 to continuously maintain its expanding area A2.

In association with the foregoing detection of the subject and auto focusing operation, a luminance signal level of the subject detected in the corresponding area is detected by evaluation value detecting section 46. Thus, in accordance with the result of comparing the detected value with a predetermined reference value, the auto focusing is performed by driving lens driving motor 140 via motor driving section 130.

That is, the subject picked up by optical system 10 involves a distinct difference (or change) in the luminance signals between the subject and the background image. Due to this fact, by evaluating the luminance signal value, the presence or absence of the subject corresponding to the background image can be detected. Thereafter, the auto focusing is accomplished by driving the lens to the direction and position where the luminance signal having the maximum level is detected, to be matched with the detected subject.

In the above-described conventional technique for dividing the picture area into areas A1 and A2 and variably controlling the areas as shown in FIG. 2, the auto focusing is performed by detecting the subject under the state of changing into area A2 unless the subject is detected in area A1. However, area A2 is continuously maintained even after executing the auto focusing to have a drawback that, if a new subject is joined later, the auto focusing upon multiple subjects caused by the new subject becomes impossible in expanding area A2.

SUMMARY OF THE INVENTION

The objects of the present invention are to overcome problems and disadvantages of the conventional apparatus and method for controlling focusing areas of a camera.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

Therefore, it is an object of the present invention to provide a method for controlling focusing areas of a camera capable of enhancing precision of the auto focusing with respect to a main subject in the case of multiple subjects, continuously tracking the auto focusing of a subject that moves to the outer peripheral side of the center of a picture, and improving a tracking property with respect to the center area when varying the picture areas.

It is another object of the present invention to provide an apparatus for controlling focusing areas of a camera capable of enhancing precision of auto focusing with respect to a main subject in case of multiple subjects, continuously tracking the auto focusing of a subject that moves to the outer peripheral side of the center of a picture, and improving the tracking property with respect to the center area when variably changing the picture areas.

To achieve the above objects, the present invention is performed by partitioning a picture area of a subject picked up by an optical system into a supervisory area and a focusing area. Then, in accordance with the result of subject detection in the supervisory area, auto focusing is performed in the supervisory area, or a supervisory mode is entered that carries out constant detection of the subject in the supervisory area after or during auto focusing. The auto focusing is performed by executing the area variation into a variable area to detect the subject.

More specifically, a first aspect of a method for controlling focusing areas of a camera according to the present invention is carried out by partitioning a picture image area representing an image of a subject into a plurality of picture areas and setting a supervisory area among the plurality of picture areas. A focusing area is set among said plurality of picture areas based on whether the subject is present or absent in the supervisory area, and an auto focusing operation is performed in the focusing area.

A second aspect of the method for controlling focusing areas of the camera according to the present invention is carried out by partitioning a picture image area representing an image of a subject into a plurality of picture areas and setting a center area among the plurality of picture areas as a first area and an outer peripheral area as a second area. One of the first and second areas is set as a focusing area, and an auto focusing operation is performed in the focusing area. Another of the first and second areas is set as a supervisory area, and a presence or absence of the subject within the supervisory area is detected while setting the focusing area. Exchanging the focusing area and the supervisory area; performing an auto focusing operation on the focusing area; and detecting the presence or absence of the subject within the supervisory area are repeated, when the presence of the subject within the supervisory area is detected.

Furthermore, an apparatus for controlling focusing areas of a camera includes a first detector for setting a supervisory area among a plurality of picture areas collectively representing an image field, and detecting whether a subject is present or absent within the supervisory area; a second detector for setting a focusing area among the plurality of picture areas, and detecting whether a subject is present or absent within the focusing area; and a controller for exchanging the supervisory area and the focusing area based on a result of the detecting of the first detector, and for performing an auto focusing operation in the focusing area, and continuously detecting whether a subject is present or absent within the supervisory area.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

To begin with, a first embodiment of a method for controlling focusing areas of a camera according to the present invention will be described. The first embodiment of the method for controlling focusing areas of the camera is performed by a first step of partitioning a picture area of a subject image picked up by the optical system into a plurality of picture areas and setting a center area among the plurality of picture areas as a supervisory area. In a second step, an optional picture area among the plurality of picture areas is set as a focusing area in accordance with whether a subject is detected within the supervisory area or not. Successively, after executing the second step, the auto focusing is performed in a third step. Then, a fourth step is carried out in a manner to advance to a supervisory mode for constantly detecting the subject with respect to the supervisory area, after completing the third step.

Figure 1:
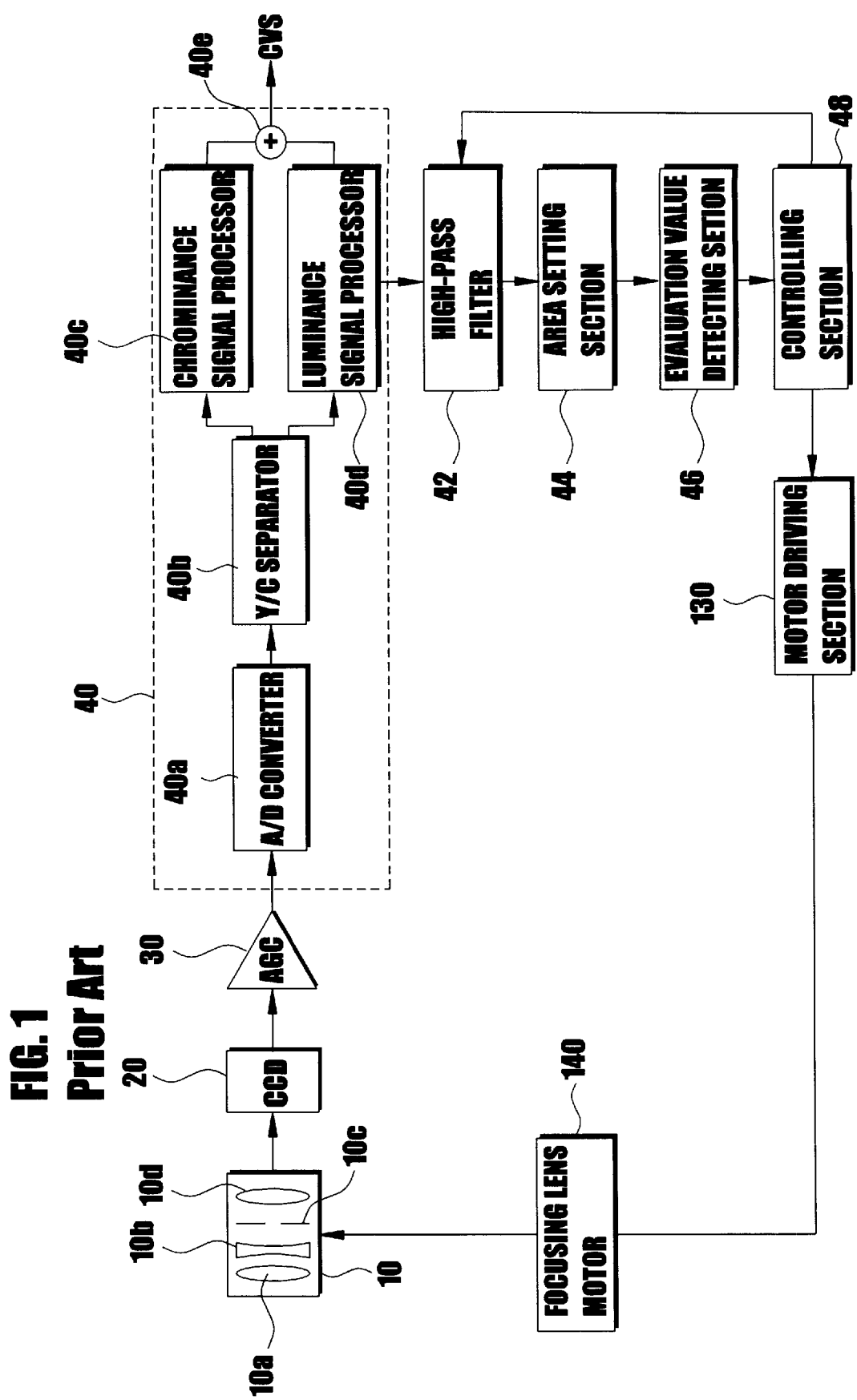
FIG. 1 is a block diagram showing a conventional apparatus for controlling focusing areas of a camera.
Figure 2:
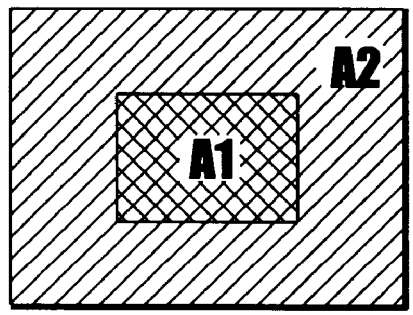
FIG. 2 is a view for explaining the setting of the focusing areas according to a conventional method.
Figure 3:
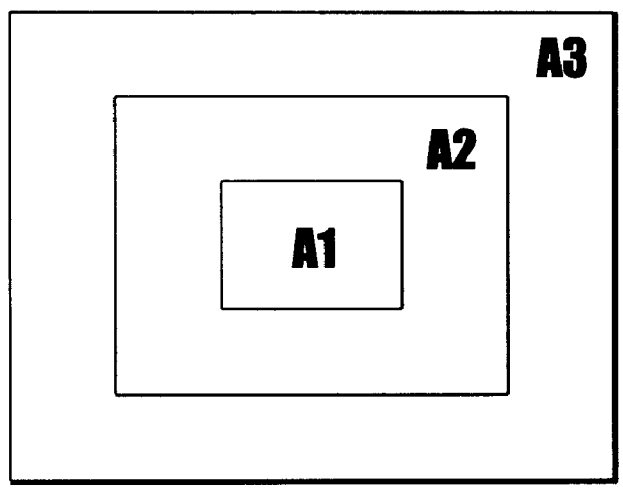
FIG. 3 is a view for explaining the setting of the focusing areas in a first embodiment of a method for controlling focusing areas according to the present invention.
Figure 4:
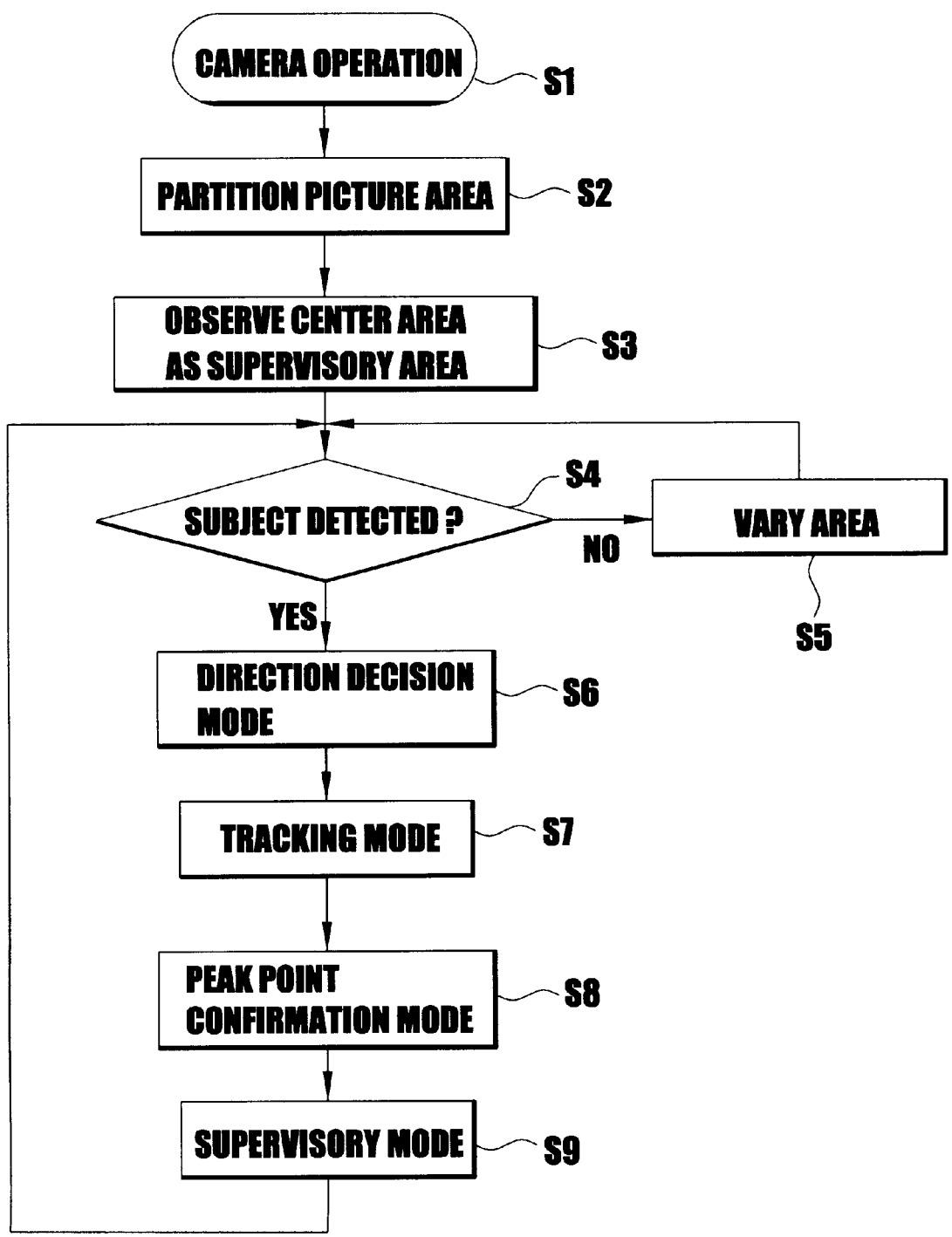
FIG. 4 is a flowchart of the first embodiment of the method for controlling focusing areas according to the present invention.

FIG. 3 illustrates the plurality of partitioned picture areas set in the first embodiment of the method for controlling focusing areas of the camera, and FIG. 4 is a flowchart for embodying the first embodiment of the method for controlling focusing areas of the camera.

As shown in FIG. 3, in the first embodiment of the present method, the picture areas are, preferably, identified by setting supervisory area A1 in the center area, and a first variable area A1+A2 and a second variable area A1+A2+A3 gradually expanding across the areas in the outer periphery.

Referring to FIG. 4, once the camera begins operating in step S1, the image of the subject picked up by the optical system is partitioned into plurality of areas A1, A2 and A3 in step S2. Then, center area A1 among plurality of areas A1, A2 and A3 is set as the supervisory area in step S3 to judge whether the subject is detected or not while constantly observing supervisory area A1 in step S4.

In accordance with the result of the subject detection within supervisory area A1, a proper focusing area is set among plurality of partitioned picture areas A1, A2 and A3.

In other words, when the subject is detected in supervisory area A1, the evaluation value with respect to the luminance signal of the subject is detected in supervisory area A1 to decide the driving direction of the focusing lens for performing the auto focusing in step S6.

In response to the result of the decision with respect to the focusing lens driving direction of step S6, the focusing lens is driven in supervisory area A1 to track the subject in step S7. In step S8, a peak confirmation is carried out before/after a point (a peak of transiting the luminance signal) determined as the subject (i.e., the focusing lens is properly driven forward and backward).

Upon the completion of the auto focusing in S6, S7 and S8 with respect to the subject in supervisory area A1 as described above, the program advances to the supervisory mode that constantly detects the subject with respect to supervisory area A1 in step S9, thereby continuously performing the subject detection within supervisory area A1.

However, if the subject is not detected in supervisory area A1, the area is variably extended to first variable area A1+A2 in step S5 to attempt to detect the subject in first variable area A1+A2 in step S4. If the subject is not detected in this area either, the area is variably extended to second variable area A1+A2+A3 in step S5, thereby detecting the subject in second variable area A1+A2+A3 in step S4.

When the subject is detected in first variable area A1+A2 or second variable area A1+A2+A3, the evaluation value with respect to the luminance signal of the subject is detected in the corresponding area, so that the driving direction of the focusing lens is determined to perform the auto focusing in step S6.

In response to the result of the decision with respect to the focusing lens driving direction of step S6, the focusing lens is driven in the supervisory area to track the subject in step S7. In step S8, a peak confirmation is carried out before/after a point (a peak of transiting the luminance signal) determined as the subject (i.e., the focusing lens is properly driven forward and backward).

Upon the completion of the auto focusing in S6, S7 and S8 with respect to the subject in the supervisory area as described above, the program advances to the supervisory mode that constantly detects the subject with respect to supervisory area A1 in step S9, thereby continuously performing the subject detection within supervisory area A1.

That is, supervisory area A1 is employed only for observing the subject, and the variation (change) of the area is performed with respect to just first variable area A1+A2 and second variable area A1+A2+A3.

Hereinbelow, a second embodiment of the method for controlling focusing areas of the camera according to the present invention will be described. The second embodiment of the method for controlling focusing areas of the camera according to the present invention is performed by the sequence of a first step of partitioning a picture area of a subject image picked up by the optical system into a plurality of areas and setting a center area among the plurality of picture areas into a first area and an outer peripheral area into a second area. Then, in a second step, an optional area either the first area or second area is set as a focusing area to execute the auto focusing. A third step is performed by detecting the presence or absence of the subject, using the other area which is not the focusing area, between the first and second areas as a supervisory area. Successively, if the detection in the third step results in the presence of the subject within the supervisory area, the focusing area of the second step is shifted to be the supervisory area of the third step, thereby repeating the second and third steps in a fourth step.

Figure 5:
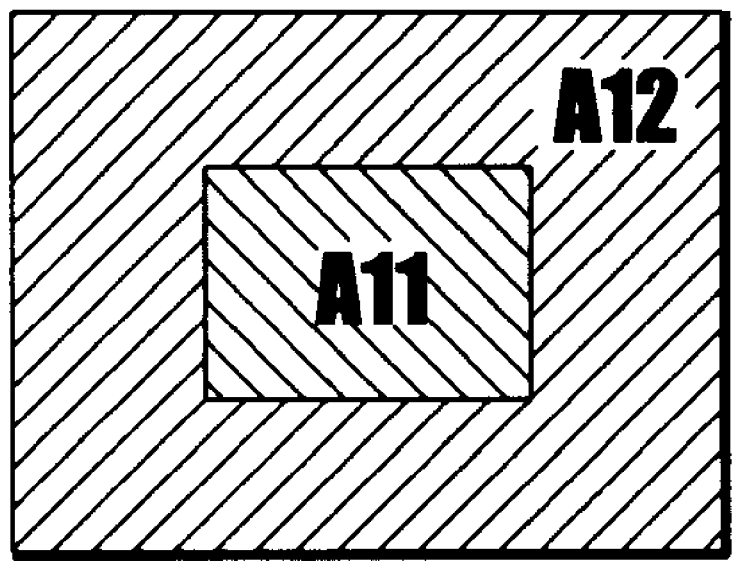
FIG. 5 is a view for explaining the setting of the focusing areas in a second embodiment of the method for controlling focusing areas according to the present invention.
Figure 6:
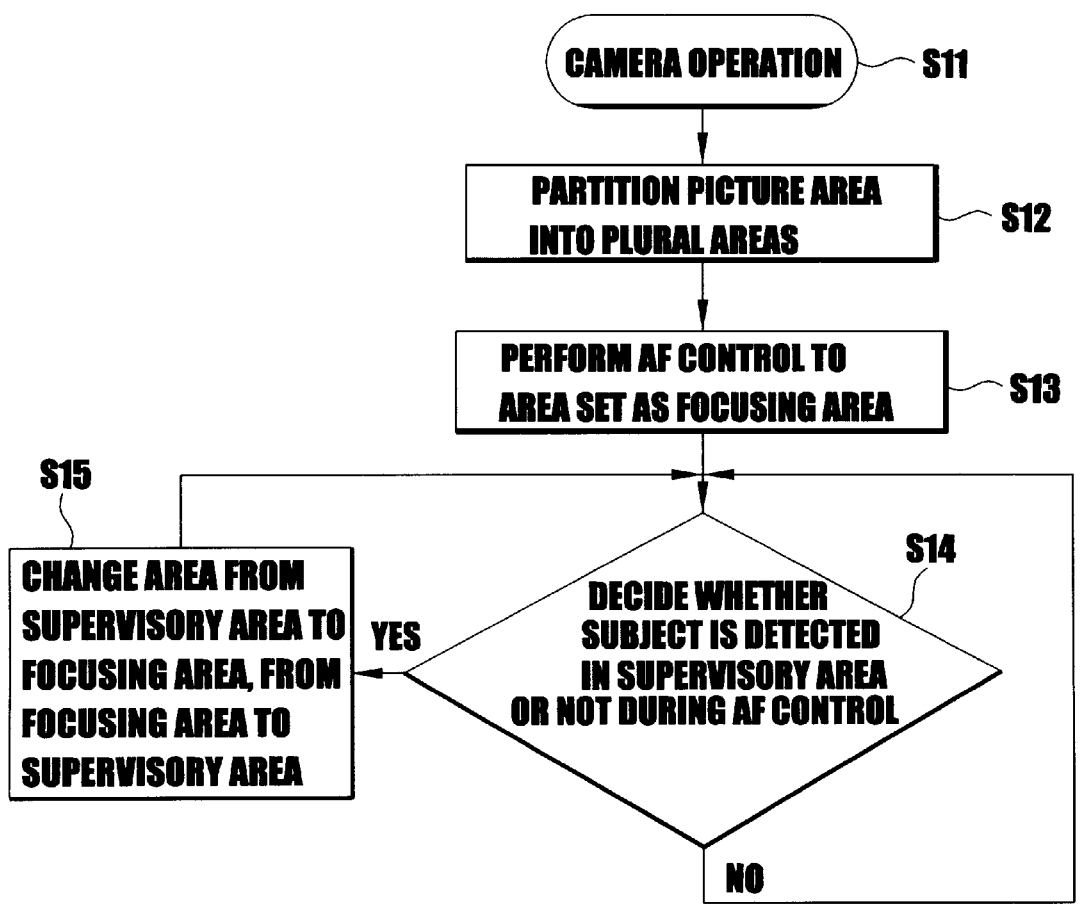
FIG. 6 is a flowchart of the second embodiment of the method for controlling focusing areas according to the present invention.

FIG. 5 illustrates the plurality of partitioned picture areas set in the second embodiment of the method for controlling focusing areas according to the present invention, and FIG. 6 is a flowchart for embodying the second embodiment of the method for controlling focusing areas according to the present invention.

As shown in FIG. 5, in the second embodiment of the present method, a picture area of a subject image picked up by the optical system is partitioned into plurality of areas A11 and A12.

Preferably, center area A11 among the plurality of picture areas A11 and A12 is set as the first area and outer peripheral area A12 is set as the second area.

During performing the auto focusing by setting an optional area either the first area or second area into the focusing area, the other area which is not the focusing area is employed as the supervisory area to detect the presence or absence of the subject.

For example, in case that supervisory area A11 is set and supervisory area A11 and variable area A12 (where areas A11 and A12 are exclusive from each other) are shifted to each other, as shown in FIG. 6, the camera operation begins in step S11. Then, the picture area of the subject image picked up by the optical system is partitioned into plurality of picture areas A11 and A12 in step S12. After this, the auto focusing is carried out with respect to area A12 set as the focusing area in step S13. The subject detection is decided within the area set as supervisory area A11 during executing the auto focusing in step S14. If the subject is detected in supervisory area A11 in step S14, the supervisory area is changed into area A12 from area A11, the focusing area is changed into area A11 from area A12 in step S15. Under this changed state, the program proceeds to step S13 to perform the auto focusing in accordance with the result of the decision in step S14. Whereas, if it is decided that the subject is not detected in supervisory area A11 in step S14, the program proceeds to step S13 to continue the auto focusing in the previous focusing area prior to being changed.

In other words, supervisory area A1 executes only the subject observation while the area shift is performed with respect to first variable area A1+A2 and second variable area A1+A2+A3 in the first embodiment of the method according to the present invention shown in FIG. 3. By contrast, in the second embodiment of the present invention shown in FIG. 6, supervisory area A11 and variable area A12 are shifted to each other in accordance with the detection of the subject in the supervisory area.

Now, referring to FIG. 7, an apparatus for controlling focusing areas for performing the method for controlling focusing areas of the camera according to the present invention will be described.

Figure 7:
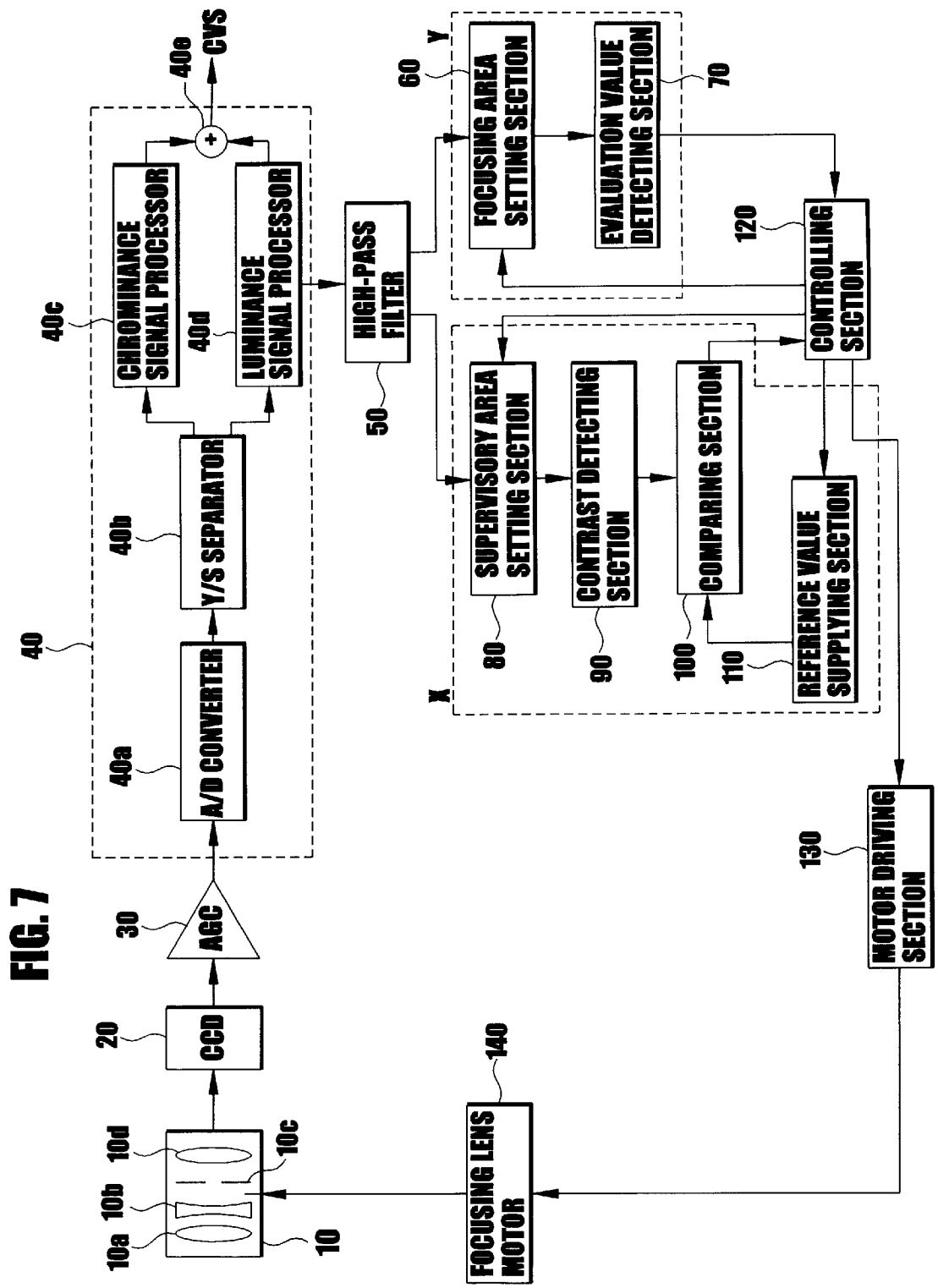
FIG. 7 is a block diagram showing an apparatus for controlling focusing areas of a camera for performing the method for controlling focusing areas of the camera according to the present invention.

The apparatus for controlling focusing areas of the camera according to the present invention shown in FIG. 7 includes an optical system 10 formed by an objective lens 10a, a zoom lens 10b, an iris 10c and a focusing lens 10d for picking up the image of the subject by a prescribed picture area. Also, a CCD 20 converts the image of the subject picked up by optical system 10 into an electric video signal, and an AGC circuit 30 performs the automatic gain control of the video signal converted by CCD 20. In addition to these, a digital processing section 40 digitizes the AGC-processed video signal and separates the digitized signal into a luminance signal and a chrominance signal to process them, and a high-pass filter 50 filters an output luminance signal of digital signal processing section 40 to provide high band components thereof. A supervisory area setting section 80 sets a first predetermined area among the picture areas of optical system 10 formed of the output signals of high-pass filter 50 as a supervisory area, and a contrast detecting section 90 obtains an integrated value of the filtered high band components with respect to the supervisory area. Also included as part of the apparatus are a reference value supplying section 110 for supplying a reference value of a contrast value, and a comparing section 100 for comparing an output value of contrast detecting section 90 with the reference value supplied from reference value supplying section 110. A focusing area setting section 60 sets a predetermined second area among the picture areas of optical system 10 as a focusing area. An evaluation value detecting section 70 detects an evaluation value with respect to the focusing area set by focusing area setting section 60. A controlling section 120 executes the auto focusing control in the focusing area by performing the area shift from the supervisory area into the focusing area when the subject is not detected in the supervisory area, while constantly observing the presence or absence of the subject in the supervisory area based on the output of comparing section 100. Further to this, controlling section 120 controls to continuously observe the presence or absence of the subject in the supervisory area even after completing the auto focusing or during performing the auto focusing in the focusing area. A motor driving section 130 receives a lens driving control signal from controlling section 48 to drive a focusing lens driving motor 140 which is driven under the control of motor driving section 130 for driving focusing lens 10d.

The image picked up in optical system 10 is converted into the electric video signal in CCD 20 via objective lens 10a, zoom lens 10b, iris 10c and focusing lens 10d. Then, the obtained video signal is automatically gain-controlled by AGC circuit 30 to be supplied into digital signal processing section 40.

An A/D converter 40a of digital signal processing section 40 converts an analog video signal input into a digital signal, and an Y/C separator 40b separates the digital video signal into a luminance signal Y and a chrominance signal C.

Separated chrominance signal C is processed via a chrominance signal processor 40c, and luminance signal Y is processed via a luminance signal processor 40d. By doing so, a composite video signal CVS is obtained by adding signals Y and C in adder 40e.

At this time, the luminance signal provided from luminance signal processor 40d is filtered by high-pass filter 50 to provide only the high band components of the luminance signal corresponding to the outline portion of the image. Under the control of controlling section 120, supervisory area setting section 80 sets the predetermined first area, preferably the center area, among the picture areas of optical system 10 formed of the output signals of high-pass filter 50 as the supervisory area.

With respect to the supervisory area set by supervisory area setting section 80, contrast detecting section 90 obtains the integrated value of the filtered high band components. The detected integrated value is supplied to comparing section 100 together with the reference value of the contrast value with respect to the supervisory area supplied from reference value supplying section 110. Then, comparing section 100 compares the output value of contrast detecting section 90 with the reference value supplied from reference value supplying section 110 to provide the result of the comparison to controlling section 120.

Aforementioned supervisory area setting section 80, contrast detecting section 90, comparing section 100 and reference value supplying section 110 function as a detecting section X which detects the presence or absence of the subject in the supervisory area.

In the meantime, controlling section 120 determines that the subject is detected in the set supervisory area when the integrated value of the outline components is larger than the reference value in the set supervisory area. Or it determines that the subject is not detected in the set supervisory area when the integrated value of the outline components is smaller than the reference value in the set supervisory area.

When it is determined that the subject is detected in the supervisory area, controlling section 120 provides the lens driving control signal to control motor driving section 130. Focusing lens motor 140 drives focusing lens 10d based on the control output of motor driving section 130, thereby carrying out the auto focusing control in the supervisory area.

However, if it is determined that the subject is not detected in the supervisory area, controlling section 120 decides whether the subject is detected or not in the focusing area, which is to be described later.

Here, under the control of controlling section 120, focusing area setting section 60 sets the predetermined second area among the picture areas of optical system 10 formed of the output signals of high-pass filter 50 as the focusing area.

Evaluation value detecting section 70 then detects the evaluation value by a difference value of the integrated values of the filtered high band components with respect to the focusing area set by focusing area setting section 60.

At this time, focusing area setting section 60 and evaluation value detecting section 70 function as a detecting section Y which detects the presence or absence of the subject in areas except the supervisory area.

On the other hand, when the subject detection in the focusing area is determined in accordance with the output of evaluation value detecting section 70, controlling section 120 provides the lens driving control signal to control motor driving section 130. Then, focusing lens motor 140 drives focusing lens 10d based upon the control output of motor driving section 130, thereby executing the auto focusing in the focusing area.

Here, the focusing area may consist of plurality of areas. In this case, if it is decided that the subject is not detected in the supervisory area, preferably, the areas nearer to the supervisory area set in the center area among the plurality of focusing areas are sequentially set as the focusing areas to decide the subject detection in corresponding area. In turn, in accordance with the result of the detection, the auto focusing control is performed in the corresponding area or the area is variably changed to the next area.

As described above, after completing the auto focusing in the focusing area, controlling section 120 advances to the supervisory mode for detecting the subject in the supervisory area. Or it continuously observes the presence or absence of the subject in the supervisory area even during executing the auto focusing in the focusing area to thereby perform the auto focusing in the supervisory area once the subject is detected in the supervisory area.

Furthermore, the focusing area may be set by excluding the supervisory area among the picture areas of optical system 10, as shown in FIG. 5.

In case that detecting section X, consisting of supervisory area setting section 80, contrast detecting section 90, comparing section 100 and reference value supplying section 110, detects the subject within the supervisory area, the supervisory area is changed by the focusing area and, vice versa, the focusing area is changed by the supervisory area to perform the auto focusing in the replaced supervisory area.

By employing the method for controlling focusing areas and apparatus for performing the same according to the present invention, the supervisory area is applied for enhancing precision of the auto focusing with respect to the center subject in case of multiple subjects. Furthermore, overall picture areas are utilized to accurately decide the direction, although there is no subject in the center area, while enabling the correct focusing.

Especially, when using a wide area, it is possible to be sensitive to the change of the main subject.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling focusing areas of a camera, comprising:

partitioning a picture image area representing an image of a subject into a plurality of picture areas;

setting a supervisory area among said plurality of picture areas;

setting a focusing area among said plurality of picture areas based on whether said subject is present or absent in said supervisory area; and performing an auto focusing operation in said focusing area.

2. A method for controlling focusing areas of a camera as claimed in claim 1, further comprising detecting whether said subject is present within said supervisory area while maintaining said focusing area.

3. A method for controlling focusing areas of a camera as claimed in claim 1, wherein said focusing area includes said supervisory area.

4. A method for controlling focusing areas of a camera as claimed in claim 2, further comprising repeatedly performing said setting a focusing area based on a result of detecting whether said subject is present within said supervisory area.

5. A method for controlling focusing areas of a camera, comprising:

partitioning a picture image area representing an image of a subject into a plurality of picture areas;

setting a center area among said plurality of picture areas as a first area and an outer peripheral area as a second area;

setting one of said first and second areas as a focusing area;

performing an auto focusing operation in said focusing area;

setting another of said first and second areas as a supervisory area;

detecting a presence or absence of the subject within said supervisory area while setting said focusing area; and exchanging said focusing area and said supervisory area and repeating said performing an auto focusing operation on said focusing area and said detecting the presence or absence of the subject within said supervisory area when said detecting detects the presence of said subject within said supervisory area.

6. A method for controlling focusing areas of a camera as claimed in claim 5, wherein said first area and second area are exclusive from each other.

7. An apparatus for controlling focusing areas of a camera, comprising:

first detector for setting a supervisory area among a plurality of picture areas collectively representing an image field and detecting whether a subject is present or absent within said supervisory area;

second detector for setting a focusing area among said plurality of picture areas, and detecting whether a subject is present or absent within said focusing area; and controller for exchanging said supervisory area and said focusing area based on a result of the detecting of said first detector and for performing an auto focusing operation in said focusing area, and continuously detecting whether a subject is present or absent within said supervisory area.

8. An apparatus for controlling focusing areas of a camera as claimed in claim 7, wherein said focusing area includes a plurality of focusing areas, and said exchanging said supervisory area and said focusing area is sequentially carried out between one of said plurality of focusing areas adjacent said supervisory area and the supervisory area.

9. An apparatus for controlling focusing areas of a camera as claimed in claim 7, wherein said focusing area includes a plurality of focusing areas and at least one of said plurality of focusing area is exclusive with said supervisory area.

10. An apparatus for controlling focusing areas of a camera as claimed in claim 9, wherein said controller includes means for exchanging said supervisory area and said focusing area when said first detector detects that said subject is present within said supervisory area.

11. An apparatus for controlling focusing areas of a camera as claimed in claim 7, wherein said controller includes means for exchanging said supervisory area and said focusing area when said first detector detects that said subject is present within said supervisory area.

12. An apparatus for controlling focusing areas of a camera as claimed in claim 7, wherein said supervisory area is a center area among said plurality of picture areas.

13. An apparatus for controlling focusing areas of a camera as claimed in claim 7, wherein said first detector includes a supervisory area setting section for setting said supervisory area first area among said picture areas; a contrast detecting section for obtaining an integrated value representing a high frequency component of a video signal representing said image field; and a comparing section for comparing said integrated value with a reference value, and wherein said second detector includes a focusing area setting section for setting said focusing area among said plurality of picture areas exclusive said supervisory area, and an evaluation value detecting section for detecting an evaluation value with respect to said focusing area, and wherein said controller means performs said auto focusing operation in said focusing area in accordance with said evaluation value and exchange said supervisory area and said focusing area when said subject is not detected in said supervisory area, while constantly detecting whether said subject is present or absent in said supervisory area based on the result of said comparing.

* * * * *